United States Patent
Tanabe et al.

(10) Patent No.: US 10,186,391 B2
(45) Date of Patent: Jan. 22, 2019

(54) CIRCUIT BREAKING SYSTEM

(71) Applicant: FANUC CORPORATION, Yamanashi (JP)

(72) Inventors: Yoshikiyo Tanabe, Yamanashi (JP); Masaru Kino, Yamanashi (JP); Yoshiki Hashimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 180 days.

(21) Appl. No.: 15/412,698

(22) Filed: Jan. 23, 2017

(65) Prior Publication Data

US 2017/0213678 A1    Jul. 27, 2017

(30) Foreign Application Priority Data

Jan. 25, 2016   (JP) .................................. 2016-011792

(51) Int. Cl.
*H01H 47/22*   (2006.01)
*H02H 7/20*    (2006.01)
*H02H 3/04*    (2006.01)
*H02H 7/26*    (2006.01)

(52) U.S. Cl.
CPC ............ *H01H 47/22* (2013.01); *H02H 3/042* (2013.01); *H02H 7/20* (2013.01); *H02H 7/26* (2013.01)

(58) Field of Classification Search
USPC ........................................................ 361/102
See application file for complete search history.

(56) References Cited

U.S. PATENT DOCUMENTS

| | | | |
|---|---|---|---|
| 3,947,859 A | * | 3/1976 | Menmuir .................. H02H 7/26 307/127 |
| 2008/0037295 A1 | * | 2/2008 | Suzuki ................. H02H 7/1227 363/40 |
| 2011/0141641 A1 | * | 6/2011 | Walling .................. H02H 7/067 361/91.1 |
| 2012/0194003 A1 | * | 8/2012 | Schmidt ............ H01L 31/02021 307/116 |
| 2017/0141722 A1 | * | 5/2017 | Misumi ................... G01R 31/02 |
| 2018/0054071 A1 | * | 2/2018 | Lasagni ................. H02H 9/001 |

FOREIGN PATENT DOCUMENTS

| JP | 2007181885 A | 7/2007 |
|---|---|---|
| JP | 2010097826 A | 4/2010 |
| JP | 2011-016391 | 1/2011 |

* cited by examiner

*Primary Examiner* — Ronald W Leja
(74) *Attorney, Agent, or Firm* — RatnerPrestia

(57) ABSTRACT

A circuit breaking system includes an output device for outputting an output signal; a control device controlled by the output signal; a power input terminal provided in the output device, for supplying power to the control device; a power supply to the output device, which has a ground terminal; a break circuit disposed between a power output terminal and the power input terminal; a switching circuit disposed between the break circuit and the power output terminal; and a short circuit disposed between a ground and a node which connects the power input terminal and the break circuit. The break circuit and the short circuit are operated so as to not be closed at the same time. When the switching circuit is closed, the break circuit is closed while the short circuit is open. When the switching circuit is open, the break circuit is open while the short circuit is closed.

5 Claims, 12 Drawing Sheets

PRIOR ART

PRIOR ART

FIG. 12

STATES MONITORING (SFDI1, SFDI2)

| KM1 | OFF | ON | — | — |
|---|---|---|---|---|
| KM2 | OFF | ON | — | — |
| FIRST CPU (SFDI1) | ON | OFF | ON | OFF |
| SECOND CPU (SFDI2) | ON | OFF | OFF | ON |
| OUTP | 0[V] | 24[V] | 24[V] | 0[V] |
| KA1 | OFF | ON | OFF | ON |
| DETERMINATION RESULT ON PRESENCE OR ABSENCE OF ABNORMALITY | NORMAL | NORMAL | CIRCUIT ABNORMALITY | CIRCUIT ABNORMALITY |

CIRCUIT BREAKING SYSTEM

This application is a new U.S. patent application that claims benefit of JP 2016-011792 filed on Jan. 25, 2016, the content of 2016-011792 is incorporated herein by reference.

BACKGROUND OF THE INVENTION

1. Field of the Invention

The present invention relates to a circuit breaking system, and more particularly relates to a circuit breaking system having a means for cutting off power to a control device and detecting a failure, when there is a short between a drive power supply and a constant power supply, in a circuit that cuts off power to drive the control device according to safety conditions such as emergency stop and servo off.

2. Description of Related Art

Drive power supplies for control devices use a circuit that cuts off power by double contacts to make sure the power is properly cut off. In this case, when there is a short between another power supply (power supply that is not cut off by the double contacts) and the drive power supply in a position beyond the double contacts, the drive power supply is supplied with power even after disconnecting the double contacts. Although the short between the power supplies can be detected by monitoring a voltage, the power supply by the short can not be disconnected, thus posing a danger.

FIG. 1 is a block diagram of a conventional device control system 1000. A power output terminal 41 of a power supply 4 is connected to a constant power supply terminal 32 of an output device 1 through a wire L1, and connected to a power input terminal 3 of the output device 1 through a wire L2. Thus, the power supply 4 supplies the output device 1 with electric power (for example, 24 [V]). A protection circuit (breaker) QF1 is disposed between the power output terminal 41 and the constant power supply terminal 32. A protection circuit (breaker) QF2 and double switching circuits (KM1, KM2) are disposed between the power output terminal 41 and the power input terminal 3. Another terminal 42, different from the power output terminal 41, of the power supply 4 is grounded.

The switching of the switching circuit KM1 is controlled by a first operating coil 71, which is operated by a signal from an output terminal DO of a first CPU 61. The switching of the switching circuit KM2 is controlled by a second operating coil 72, which is operated by a signal from an output terminal DO of a second CPU 62. The first and second operating coils 71 and 72 also control the switching of contacts of an electromagnetic contactor 200 disposed between a servo power supply 100 and a servo amplifier 300.

In the device control system 1000 shown in FIG. 1, when there is a short between the constant power supply terminal 32, which is not cut off by the double contacts, and the power input terminal 3 in a position beyond the double switching circuits KM1 and KM2, electric power is supplied from the constant power supply terminal 32 to the power input terminal 3, i.e., a drive power supply, even after disconnecting the double switching circuits KM1 and KM2.

The short occurring between the constant power supply terminal 32 and the power input terminal 3 will be described in detail. FIG. 2 shows an example of normal wiring between the output device 1 and a first control device 21 and between the output device 1 and a second control device 22. For example, the constant power supply terminal 32 and the power input terminal 3 are each branched off to a plurality of terminals in a branch terminal block, and connected to the first control device 21 and the second control device 22. Inside the first control device 21, a conductor 210 connects two of the terminals connected to the power input terminal 3.

FIG. 3 shows an example of miswiring between the output device 1 and the first control device 21 and between the output device 1 and the second control device 22. Miswiring occurs when, for example, the conductor 210 of the first control device 21 is wrongly connected to the constant power supply terminal 32 at one end, as shown by a dashed line, while being connected to the power input terminal 3 at the other end. The miswiring may cause a short circuit between the constant power supply terminal 32 and the power input terminal 3.

Such a short between the power supplies can be detected as a defect by connecting an input terminal DI of the first CPU 61 to the wire L2 and monitoring the voltage of the power input terminal 3, as shown in FIG. 1. However, the short circuit between the constant power supply terminal 32 and the power input terminal 3 cannot be solved. That is, even if both of the switching circuits KM1 and KM2 are in an OFF state, 24 [V] is outputted to the power input terminal (OUTP) 3, thus failing to cut off power to the power input terminal 3.

Also, circuit breakers to break an electric circuit upon the occurrence of a defect are known (for example, Japanese Unexamined Patent Publication (Kokai) No. 2011-016391, hereinafter called "patent document 1"). A circuit breaker disclosed in the patent document 1 has problems that a break circuit has to be used together with a semiconductor circuit to control the break circuit, and the addition of a failure detection circuit for the break circuit is required.

SUMMARY OF THE INVENTION

The conventional circuit breakers have problems that a break circuit has to be used together with a semiconductor circuit to control the break circuit, and the addition of a failure detection circuit for the break circuit is required.

A circuit breaking system according to an embodiment of the present invention includes an output device for outputting an output signal; a control device controlled by the output signal of the output device; a power input terminal provided in the output device, for supplying power to the control device; a power supply for supplying power to the output device, the power supply has a ground terminal; a break circuit disposed between a power output terminal, different from the ground terminal, of the power supply and the power input terminal of the output device; a switching circuit disposed between the break circuit and the power output terminal; and a short circuit disposed between a ground and a node which connects the power input terminal and the break circuit. The break circuit and the short circuit are operated so as to not be closed at the same time. When the switching circuit is closed, the break circuit is closed while the short circuit is open to supply power to the output device. When the switching circuit is open, the break circuit is open while the short circuit is closed to cut off the supply of power to the output device, and even when the power output terminal and the power input terminal are wrongly shorted out, the short circuit prevents the supply of power to the output device.

BRIEF DESCRIPTION OF THE DRAWINGS

The objects, features, and advantages of the present invention will be more apparent from the following description of embodiments in conjunction with the attached drawings, wherein:

FIG. 12 is a table showing the relationship between state monitoring signals and a defect detection result in the circuit breaking system according to the second embodiment of the present invention.

DETAILED DESCRIPTION OF THE INVENTION

A circuit breaking system according to the present invention will be described below with reference to the drawings.

First Embodiment

Figure 1:
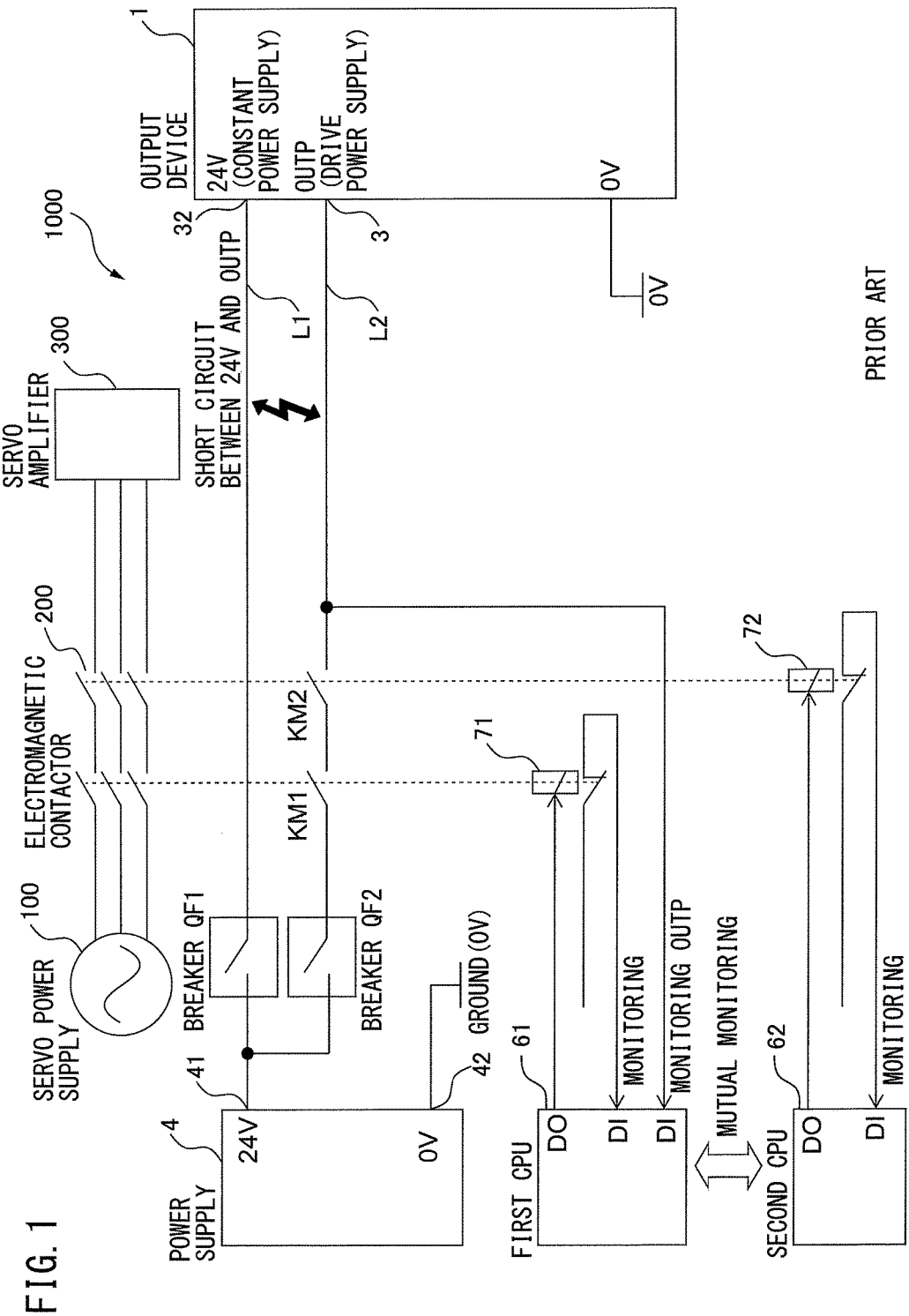
FIG. 1 is a block diagram of a conventional device control system.
Figure 2:
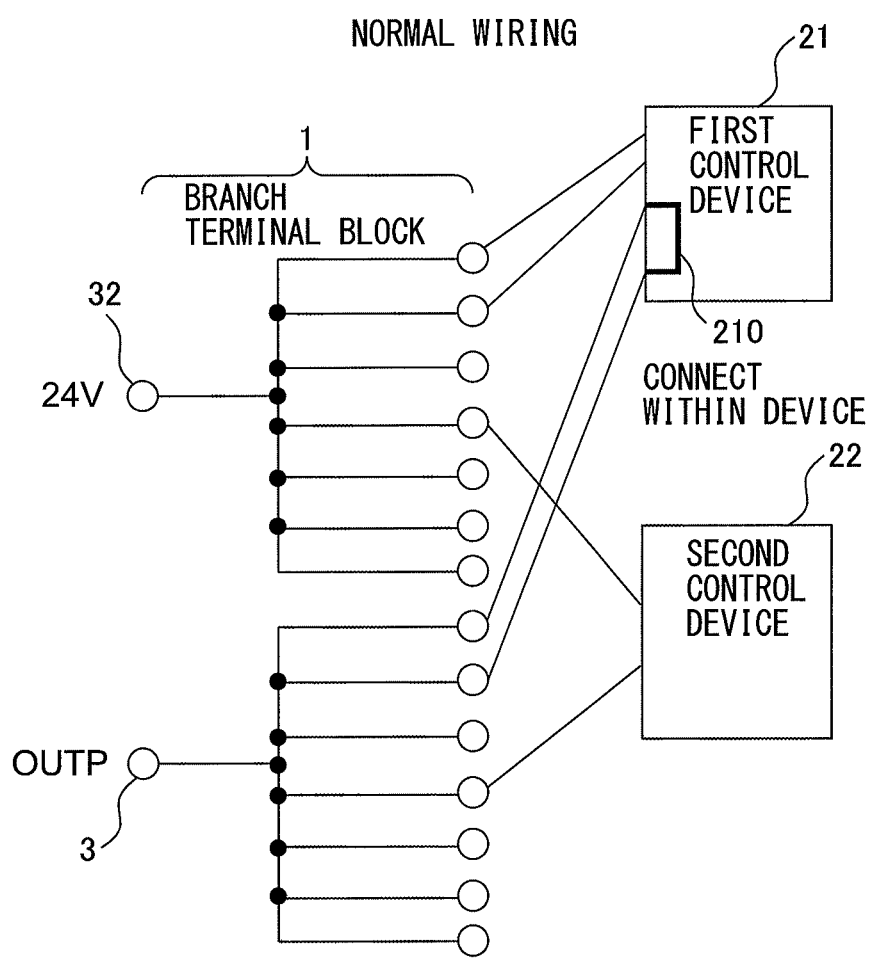
FIG. 2 is a wiring diagram showing normal wiring between a conventional output device and each control device.
Figure 3:
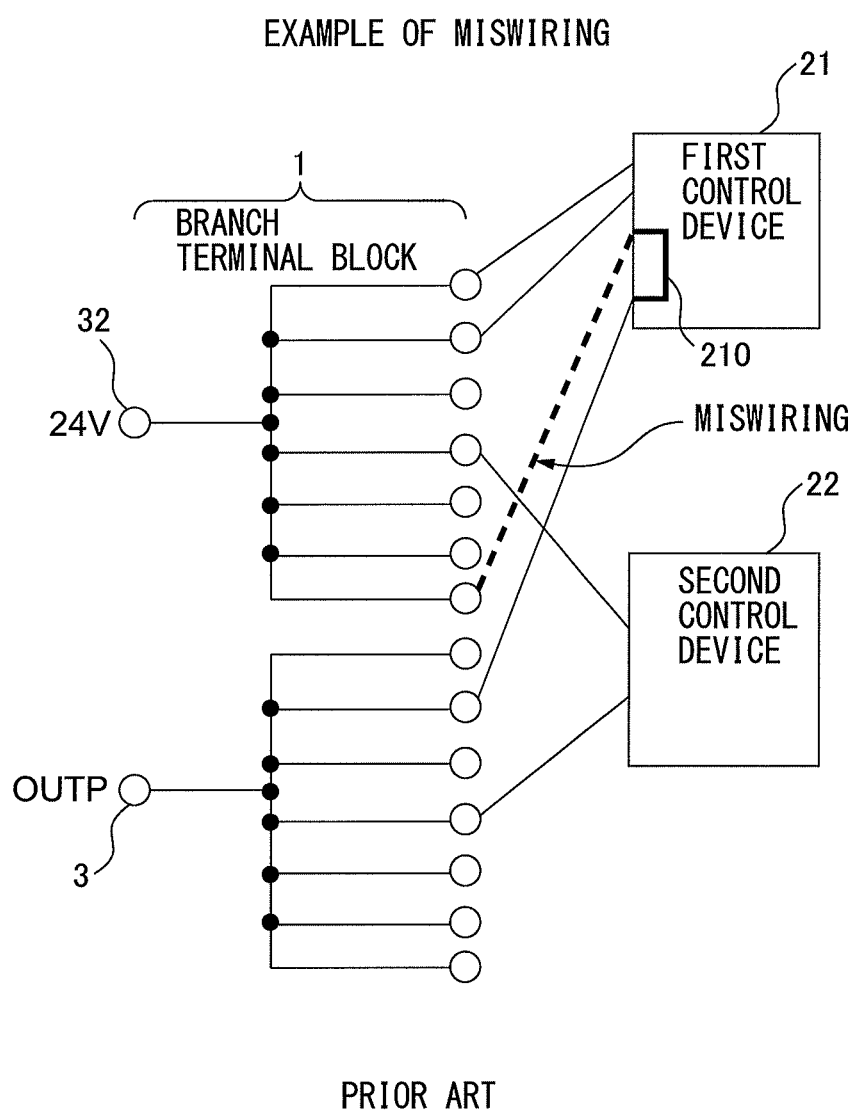
FIG. 3 is a wiring diagram showing miswiring between the conventional output device and each control device.
Figure 4:
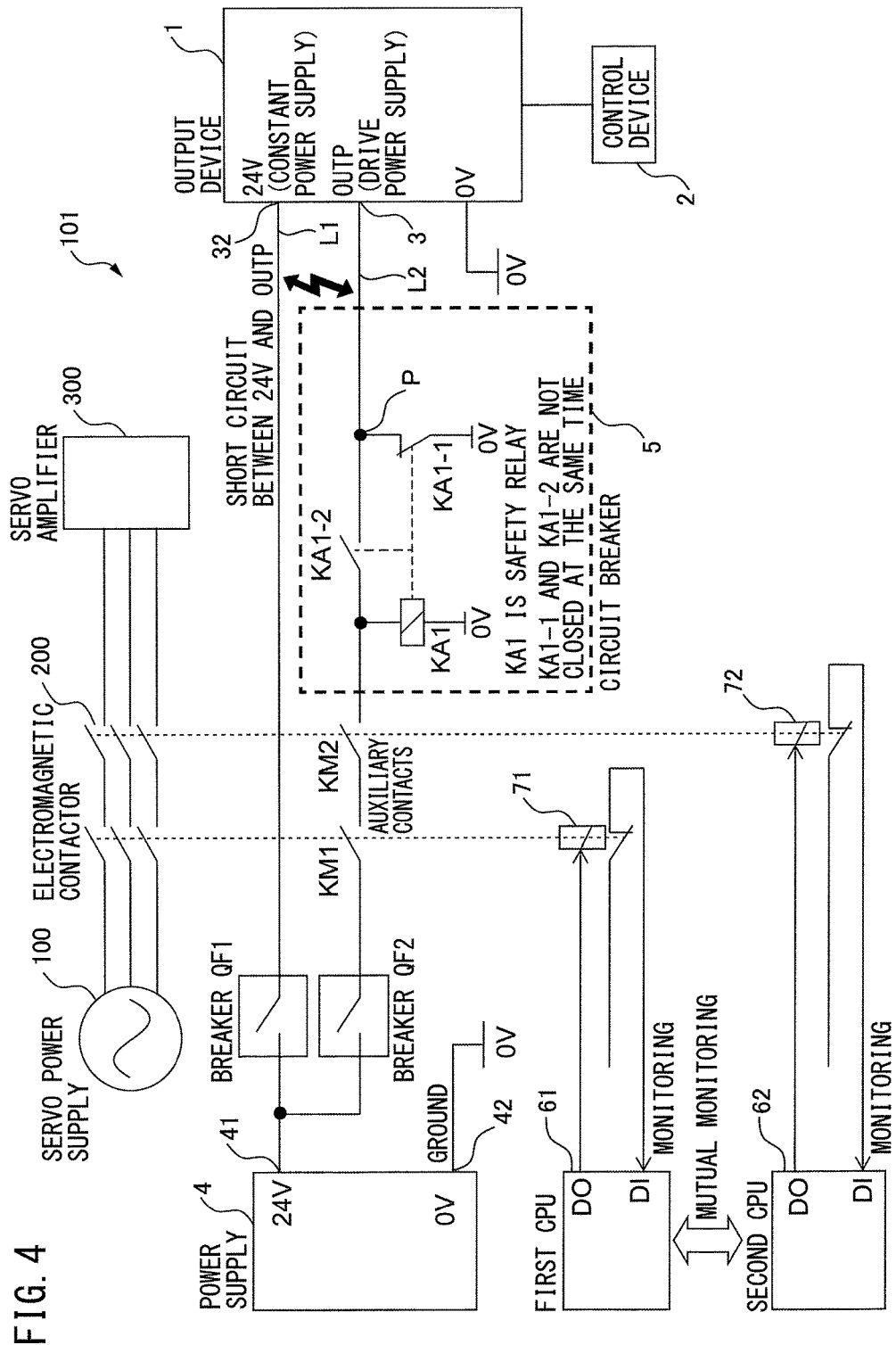
FIG. 4 is a block diagram of a circuit breaking system according to a first embodiment of the present invention.

A circuit breaking system according to a first embodiment of the present invention will be described. FIG. 4 is a block diagram of the circuit breaking system according to the first embodiment of the present invention. A circuit breaking system 101 according to the first embodiment of the present invention includes an output device 1, a control device 2, a power input terminal 3, a power supply 4, a break circuit KA1-2, a protection circuit QF2, and a short circuit KA1-1.

The output device 1 outputs an output signal to the control device 2. The output device 1 has the power input terminal 3, a constant power supply terminal 32, and a ground terminal (0 [V]). The power supply 4 supplies the constant power supply terminal 32 with, for example, 24 [V] as constant power for the output device and a network. The power input terminal 3 outputs drive power to the control device 2. The power input terminal 3 is also represented by "OUTP".

Figure 5:
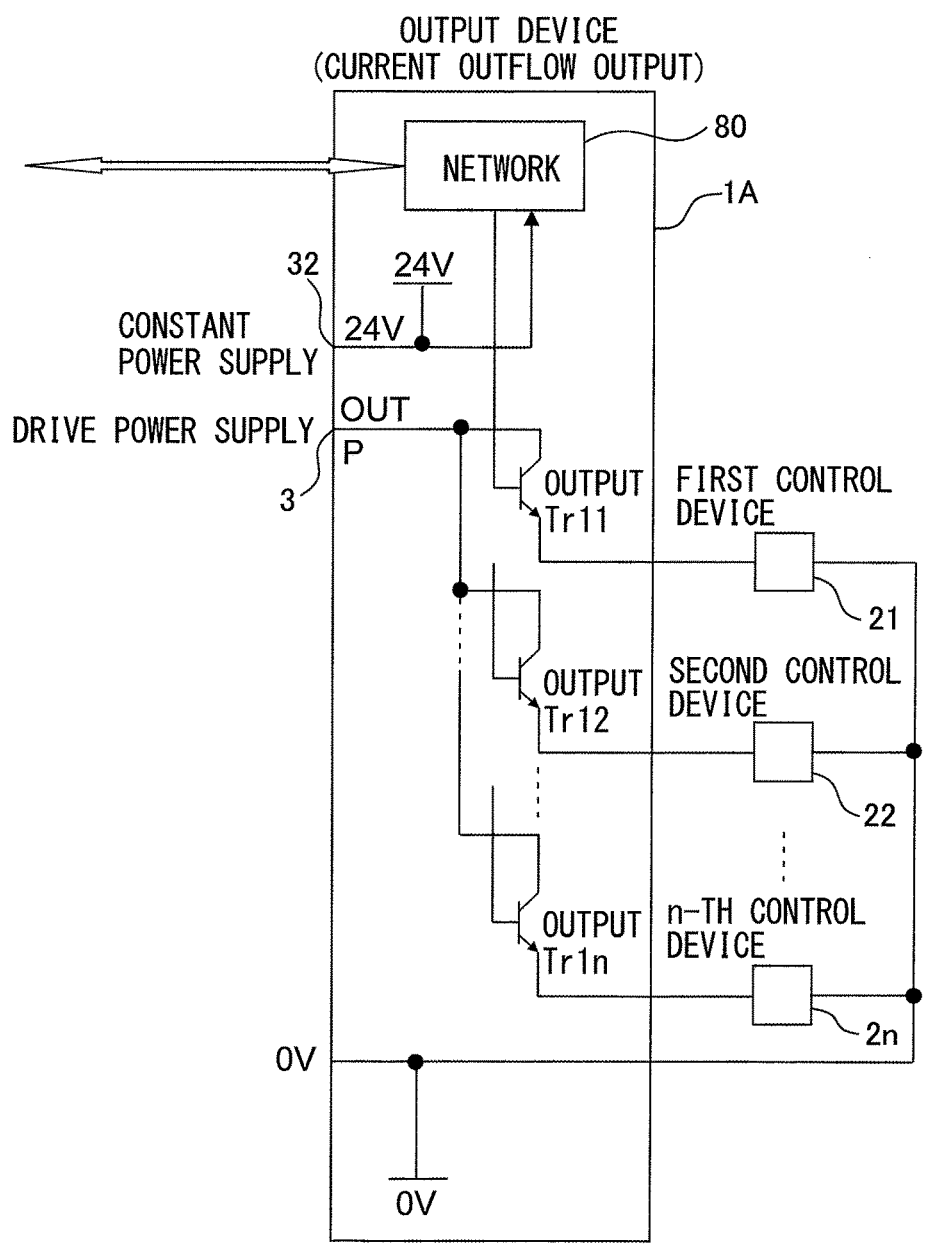
FIG. 5 is a block diagram of a current outflow output device in the circuit breaking system according to the first embodiment of the present invention.

FIG. 5 shows an example of a current outflow output device. A current outflow output device 1A includes a plurality (for example, n number) of transistors (Tr11, Tr12, ..., Tr1n) connected to a network 80, and controls a plurality (for example, n number) of first control device 21, second control device 22, ..., n-th control device 2n each connected to an emitter of each transistor.

Figure 6:
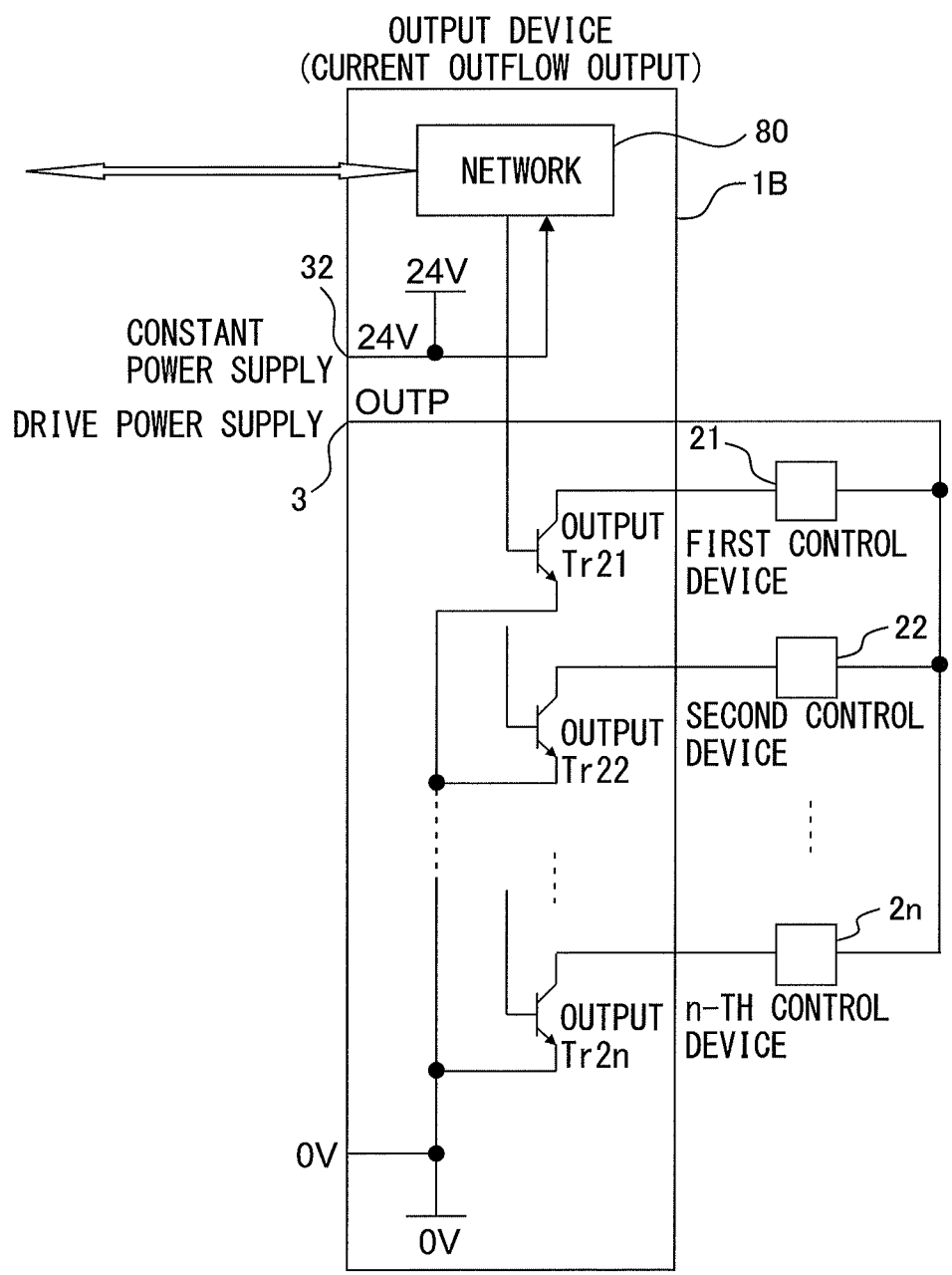
FIG. 6 is a block diagram of a current inflow output device in the circuit breaking system according to the first embodiment of the present invention.

FIG. 6 shows an example of a current inflow output device. A current inflow output device 1B includes a plurality (for example, n number) of transistors Tr21, Tr22, ..., Tr2n connected to the network 80, and controls the plurality (for example, n number) of first control device 21, second control device 22, ..., n-th control device 2n each connected to a collector of each transistor.

FIGS. 5 and 6 show the examples of the output device using the transistors as the output devices 1A and 1B, but another output module connected to the network may be used instead. As the control devices 21 to 2n, for example, relays, electromagnetic contactors, solenoid valves, I/O devices, peripheral devices, or the like may be used. In FIGS. 5 and 6, the drive power has to be cut off during servo off so as not to turn on the control devices 21 to 2n in an unintended manner.

In FIG. 4, the control device 2 is controlled by the output signal from the output device 1. FIG. 4 shows only one control device 2, by way of example, but not limited thereto, a plurality of control devices may be provided as shown in FIGS. 5 and 6.

The power input terminal 3 is provided in the output device 1, which supplies power to the control device 2.

The power supply 4 supplies power to the output device 1. The power supply 4 has a terminal 42 connected to a ground. The power supply 4 supplies a power voltage of, for example, 24 [V], but not limited thereto, may supply another voltage.

The break circuit KA1-2 is disposed between a power output terminal 41, different from the terminal 42, of the power supply 4 and the power input terminal 3 of the output device 1. The break circuit KA1-2 is a normally open contact the switching of which is controlled by a safety relay KA1. This embodiment takes the safety relay as an example, but another switch (for example, another relay or an electromagnetic contactor) may be used instead.

The protection circuit (breaker) QF2 is disposed between switching circuits (KM1, KM2) and the power output terminal 41.

The short circuit KA1-1 is provided between a ground and a node P which connects the power input terminal 3 and the break circuit KA1-2. The short circuit KA1-1 is a normally closed contact the switching of which is controlled by the safety relay KA1. The safety relay KA1 controls the switching of the break circuit KA1-2 and the short circuit KA1-1 such that both of the short circuit KA1-1 and the break circuit KA1-2 are not closed at the same time. The safety relay KA1, the short circuit KA1-1, and the break circuit KA1-2 constitute a circuit breaker 5.

When the switching circuits KM1 and KM2 are closed, the break circuit KA1-2 is closed while the short circuit KA1-1 is open, so as to supply power to the output device 1.

When the switching circuits KM1 and KM2 are open, the break circuit KA1-2 is open while the short circuit KA1-1 is closed, so as to cut off power to the output device 1. As a result, even when the power output terminal 41 and the power input terminal 3 are wrongly shorted out, the short circuit KA1-1 prevents the supply of power to the output device 1.

The power output terminal 41 of the power supply 4 is connected to the power input terminal 3 through a wire L2, as well as connected to the constant power supply terminal 32 of the output device 1 through a wire L1. The power supply 4 supplies the output device 1 with power (for example, 24 [V]). A protection circuit (breaker) QF1 is disposed between the power output terminal 41 and the constant power supply terminal 32. The protection circuit (breaker) QF2 and the two switching circuits (auxiliary contacts) KM1 and KM2 are disposed between the power output terminal 41 and the power input terminal 3. The terminal 42, different from the power output terminal 41, of the power supply 4 is connected to a ground (0 [V]).

The switching of the switching circuit KM1 is controlled by a first operating coil 71, which is operated by a signal from an output terminal DO of a first CPU 61. The switching of the switching circuit KM2 is controlled by a second operating coil 72, which is operated by a signal from an output terminal DO of a second CPU 62. The first CPU 61 and the second CPU 62 also control the switching of contacts (main contacts) of an electromagnetic contactor 200 disposed between a servo power supply 100 and a servo amplifier 300. To monitor the state of the electromagnetic contactor 200, normally closed contacts that are in synchronization with the main contacts are monitored by monitoring input terminals DI of the first CPU 61 and the second CPU 62. The main contacts of the electromagnetic contactor 200, the switching circuits (auxiliary contacts) KM1 and KM2, and the normally closed contacts (monitor) are operated in synchronization with each other by the signals to the first and second operating coils 71 and 72.

Figure 7:
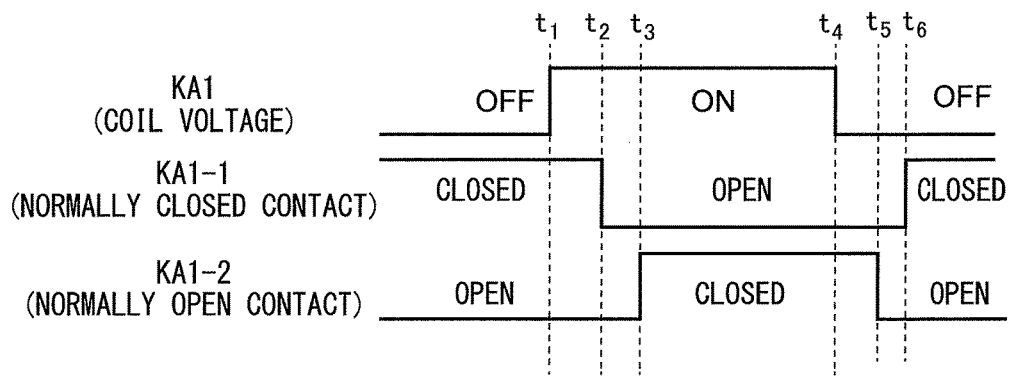
FIG. 7 is a timing chart of a safety relay, a normally closed contact, and a normally open contact in the circuit breaking system according to the first embodiment of the present invention.

Next, the operation of the safety relay KA1 will be described with reference to a timing chart of FIG. 7. First, until a time $t_1$, the safety relay KA1 is off, the short circuit KA1-1 is in a closed state, and the break circuit KA1-2 is in an open state.

The operation when switching the safety relay KA1 from an off state to an on state will be first described. Even after the safety relay KA1 is turned on at the time $t_1$, the short circuit KA1-1 is kept in the closed state and the break circuit KA1-2 is kept in the open state until a time $t_2$.

After that, at the time $t_2$, the short circuit KA1-1 is turned into an open state. As a result, both of the short circuit KA1-1 and the break circuit KA1-2 become the open state.

After that, at the time $t_3$, while the short circuit KA1-1 is in the open state, the break circuit KA1-2 is turned into a closed state.

In this manner, in a phase of switching the safety relay KA1 from the off state to the on state, the short circuit (normally closed contact) KA1-1 and the break circuit (normally opened contact) KA1-2 cannot be closed at the same time.

Next, the operation when switching the safety relay KA1 from the on state to the off state will be described. Even after the safety relay KA1 is turned off from the on state at a time $t_4$, the short circuit KA1-1 is kept in the open state and the break circuit KA1-2 is kept in the closed state until a time $t_5$.

After that, at the time $t_5$, the break circuit KA1-2 is turned into the open state. As a result, both of the short circuit KA1-1 and the break circuit KA1-2 become the open state.

After that, at a time $t_6$, the short circuit KA1-1 is turned into the closed state, while the break circuit KA1-2 is in the open state.

In this manner, in a phase of switching the safety relay KA1 from the on state to the off state, the short circuit (normally closed contact) KA1-1 and the break circuit (normally opened contact) KA1-2 cannot be closed at the same time.

Figure 8:
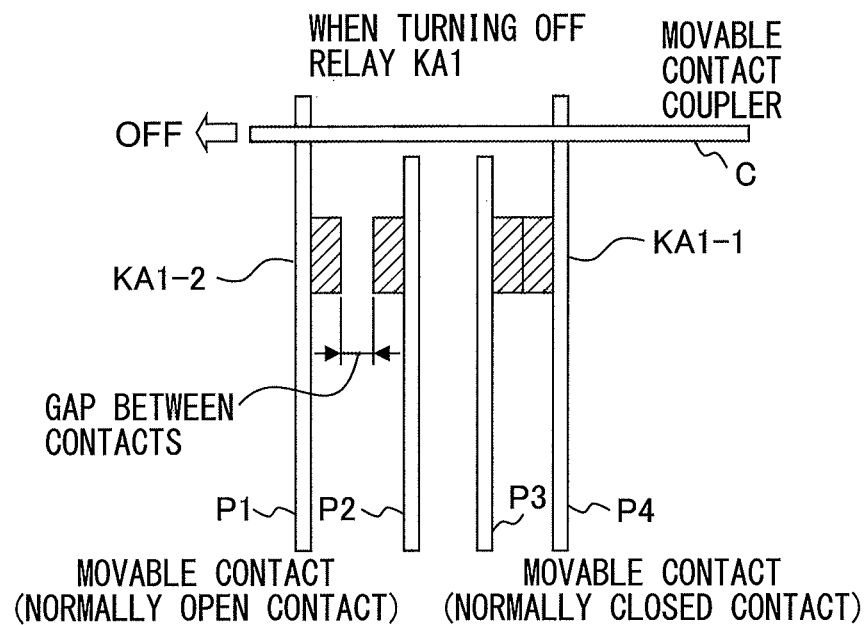
FIG. 8 is a diagram that explains the operation of the normally closed contact and the normally open contact, when the safety relay is off, in the circuit breaking system according to the first embodiment of the present invention.

Next, the operation mechanism of the safety relay KA1 will be described. FIG. 8 is a diagram that explains the operation of the normally closed contact KA1-1 and the normally open contact KA1-2, when the safety relay KA1 is in the off state, in the circuit breaking system according to the first embodiment of the present invention. The normally open contact KA1-2 has a movable contact P1 and a fixed contact P2. When the safety relay KA1 is in the off state, a gap is formed between the contacts P1 and P2 so that the normally open contact KA1-2 is in the open state.

On the other hand, the normally closed contact KA1-1 has a fixed contact P3 and a movable contact P4. When the safety relay KA1 is in the off state, the contacts P3 and P4 make contact with each other so that the normally closed contact KA1-1 is in the closed state. The movable contacts P1 and P4 are coupled by a movable contact coupler C.

Figure 9:
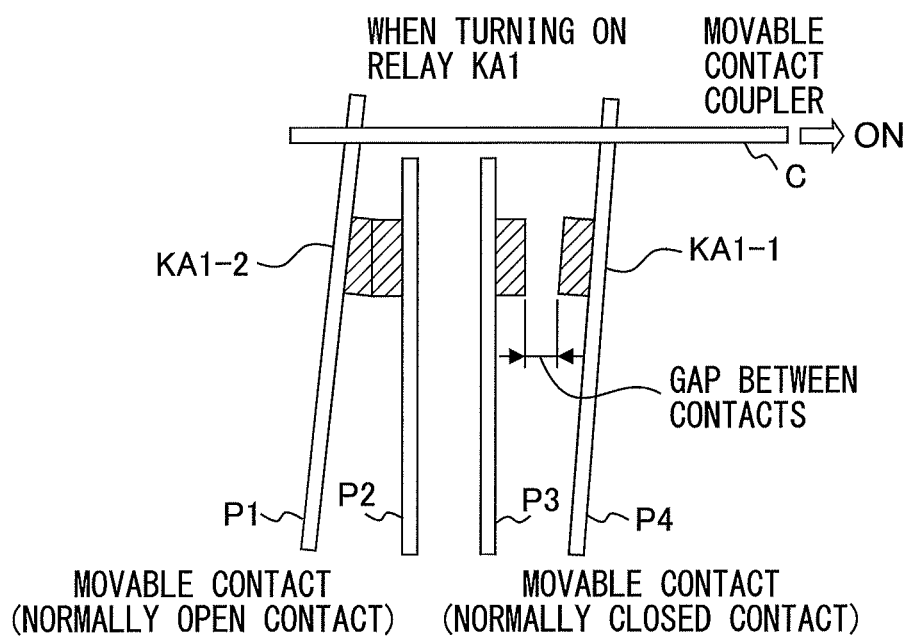
FIG. 9 is a diagram that explains the operation of the normally closed contact and the normally open contact, when the safety relay is on, in the circuit breaking system according to the first embodiment of the present invention.

Next, the operation when the safety relay KA1 is in the on state will be described. FIG. 9 is a diagram that explains the operation of the normally closed contact and the normally open contact, when the safety relay is in the on state, in the circuit breaking system according to the first embodiment of the present invention. When the safety relay KA1 is in the on state, the contacts P1 and P2 make contact with each other so that the normally open contact KA1-2 is in the closed state.

On the other hand, when the safety relay is in the on state, a gap is formed between the contacts P3 and P4 so that the normally closed contact KA1-1 is in the open state.

The contacts are structured such that a gap is formable between the contacts P1 and P2 or between the contacts P3 and P4, and the movable contacts P1 and P4 are coupled by the movable contact coupler C. Therefore, at the instant when the movable contacts P1 and P4 move, not every contact comes into contact, thus preventing the normally open contact KA1-2 and the normally closed contact KA1-1 from being together in the closed state.

Therefore, in the circuit breaking system according to the first embodiment of the present invention, each of the break circuit KA1-2 and the short circuit KA1-1 constitutes a relay contact. The break circuit KA1-2 constitutes a normally open contact, while the short circuit KA1-1 constitutes a normally closed contact. Furthermore, since the normally open contact and the normally closed contact are mechanically coupled as shown in FIGS. 8 and 9, the mechanical coupling prevents the normally open contact and the normally closed contact from being closed at the same time.

Figure 10:
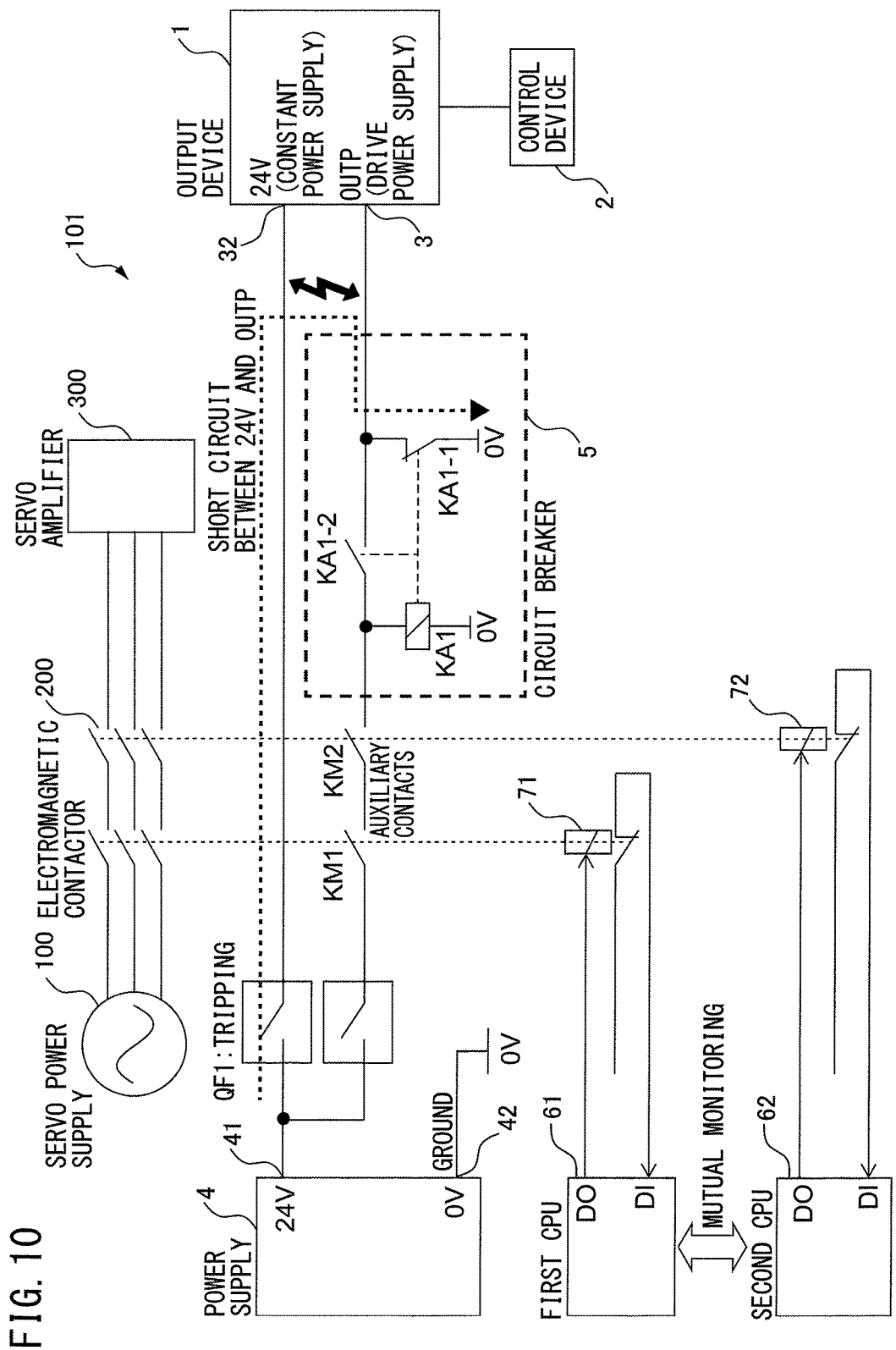
FIG. 10 is a block diagram showing a current path when a constant power supply terminal and a power input terminal are shorted out, in the circuit breaking system according to the first embodiment of the present invention.

The power output terminal 41 may be provided with a protection circuit that cuts off an output when a current of a predetermined value or more has flowed. FIG. 10 shows a current path when the constant power supply terminal and the power input terminal are shorted out, in the circuit breaking system according to the first embodiment of the present invention. In FIG. 10, a dotted arrow represents the current path when the constant power supply terminal 32 and the power input terminal 3 are shorted out.

The short circuit KA1-1 shorts out the power supply 4, and the breaker QF1 trips. Using a high-speed breaking protection circuit (for example, electronic protection circuit) as the breaker QF1 restricts a short current, thus allowing a reduction in stress on the normally closed contact.

Therefore, even if the power output terminal and the power input terminal are wrongly shorted out, the protection circuit detects an overcurrent owing to the short circuit of the power output terminal and cuts off the output of the power output terminal.

As described above, according to the circuit breaking system of the first embodiment of the present invention, while the drive power supply is turned off, the normally closed contact shorts out the power output, by taking advantage of the feature that the normally open contact and the normally closed contact are not turned on at the same time owing to a conjunction between the contacts using the safety relay, thus allowing preventing the supply of power even if there is a short circuit.

Second Embodiment

Figure 11:
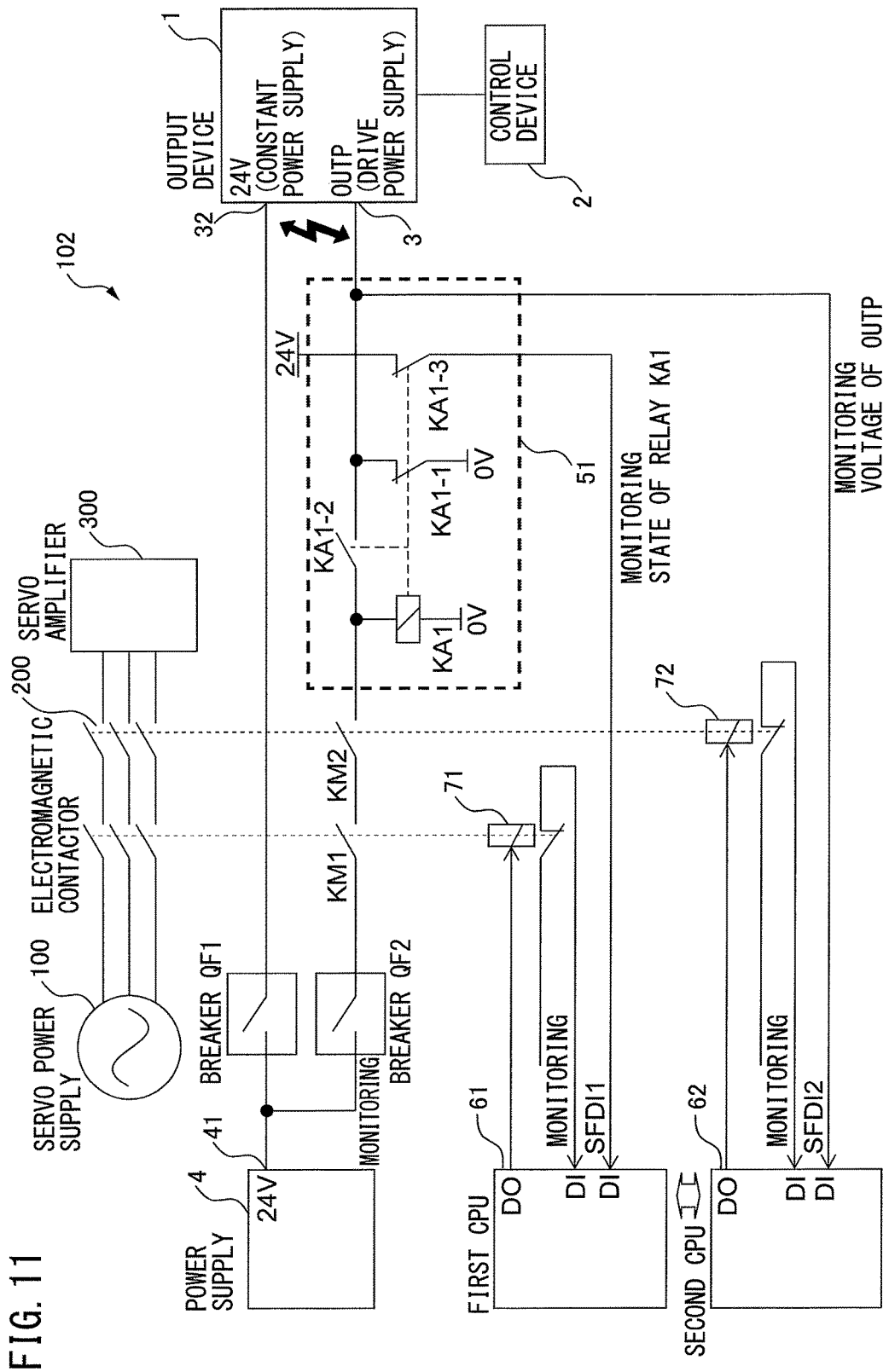
FIG. 11 is a block diagram of a circuit breaking system according to a second embodiment of the present invention.

Next, a circuit breaking system according to a second embodiment of the present invention will be described. FIG. 11 is a block diagram of the circuit breaking system according to the second embodiment of the present invention. The difference between a circuit breaking system 102 according to the second embodiment of the present invention and the circuit breaking system 101 according to the first embodiment of the present invention is that the circuit breaking system 102 has a first CPU 61 and a second CPU 62 into which a plurality of input signals (SFDI1 and SFDI2) are inputted. The first CPU 61 and the second CPU 62 monitor the voltage of the power input terminal 3 of the output device 1 and the states of the break circuit KA1-2 and the short circuit KA1-1 using the input signals inputted to the first CPU 61 and the second CPU 62. When the first CPU 61 or the second CPU 62 detects a defect in the voltage of the power input terminal 3 or a defect in the states of the break circuit KA1-2 and the short circuit KA1-1, a notification of the defect is provided. The other configuration of the circuit breaking system 102 according to the second embodiment is the same as that of the circuit breaking system 101 according to the first embodiment, so a detailed description thereof is omitted.

As shown in FIG. 11, a circuit breaker 51 includes a contact KA1-3, which is connected to a power supply of 24 [V] at one end. The contact KA1-3 is controlled by a safety relay KA1. A signal SFDI1 from the contact KA1-3 is inputted to the first CPU 61. The first CPU 61 monitors the state of the safety relay KA1 using the input signal SFDI1.

The second CPU 62 monitors the voltage of the power input terminal (OUTP) 3 of the output device 1 as a signal SFDI2.

Therefore, it is possible to determine whether or not the circuit breaker 51 normally operates from the input signal SFDI1 of the first CPU 61, the input signal SFDI2 of the second CPU 62, the voltage of the power input terminal (OUTP) 3, and the on/off state of the safety relay KA1. FIG. 12 shows examples of the various states and a determination result on the presence or absence of a defect.

For example, in a case where both of KM1 and KM2 are off, when the SFDI1 is on, the SFDI2 is on, the OUTP is 0 [V], and the KA1 is off, the circuit breaking system 102 is determined to be normal. Also, in a case where both of the KM1 and the KM2 are on, if the SFDI1 is off, the SFDI2 is off, the OUTP is 24 [V], and the KA1 is on, the circuit breaking system 102 is determined to be normal.

On the other hand, when the SFDI1 is on, the SFDI2 is off, the OUTP is 24 [V], and the KA1 is off, the circuit breaking system 102 is determined to be abnormal irrespective of whether the KM1 and the KM2 are on or off, because the OUTP should be 0 [V] if it is normal. Also, when the SFDI1 is off, the SFDI2 is on, the OUTP is 0 [V], and the KA1 is on, the circuit breaking system 102 is determined to be abnormal irrespective of whether the KM1 and the KM2 are on or off, because the OUTP should be 24 [V] if it is normal.

As described above, the circuit breaking system according to the second embodiment of the present invention can detect a circuit defect by monitoring the circuit breaker and the terminal voltage of the output device.

Third Embodiment

Figure 13:
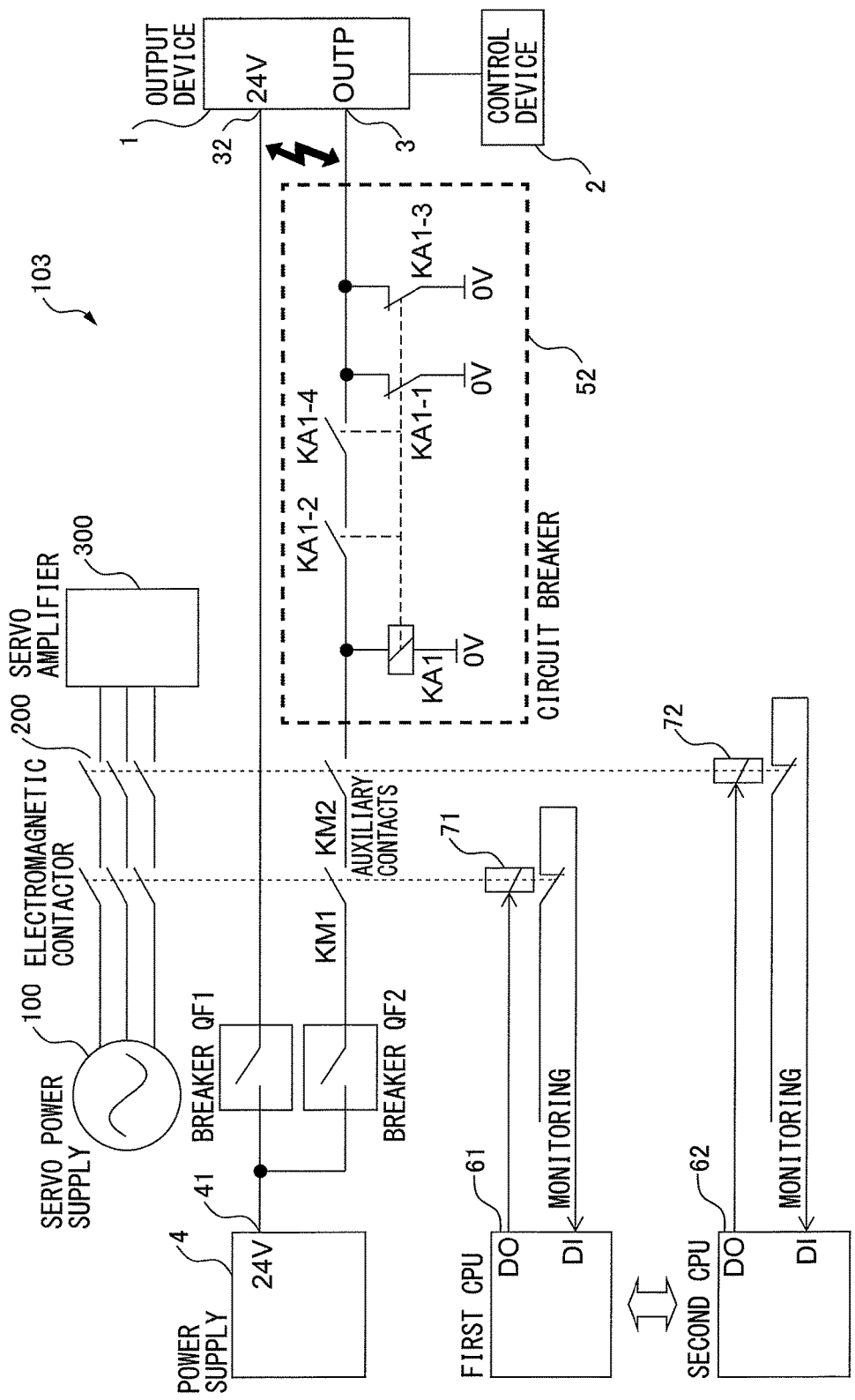
FIG. 13 is a block diagram of a circuit breaking system according to a third embodiment of the present invention.

Next, a circuit breaking system according to a third embodiment of the present invention will be described. FIG. 13 is a block diagram of the circuit breaking system according to the third embodiment of the present invention. The difference between a circuit breaking system 103 according to the third embodiment of the present invention and the circuit breaking system 101 according to the first embodiment of the present invention is that a break circuit KA1-2 has at least one other break circuit KA1-4 connected in series, and a short circuit KA1-1 has at least one other short circuit KA1-3 connected in parallel. The at least one other break circuit KA1-4 opens and closes in the same manner as the break circuit KA1-2. The at least one other short circuit KA1-3 opens and closes in the same manner as the short circuit KA1-1. The other configuration of the circuit breaking system 103 according to the third embodiment is the same as that of the circuit breaking system 101 according to the first embodiment, so a detailed description thereof is omitted.

As shown in FIG. 13, a safety relay KA1 easily constitutes a circuit breaker 52 with the use of a multi-contact relay. FIG. 13 shows an example in which two contacts are connected in series as the break circuits in the circuit breaker 52, but not limited thereto, three or more contacts may be connected in series. FIG. 13 shows the example in which two contacts are connected in parallel as the short circuits, but not limited thereto, three or more contacts may be connected in parallel.

The provision of the at least one other break circuit connected in series to the break circuit reduces damage owing to arc discharge associated with the open and close of the contacts, thus allowing an increase in the lifetime of the contacts. Moreover, the provision of the at least one other short circuit connected in parallel with the short circuit ensures the correct functioning of one of the short circuits, even if the other short circuit malfunctions owing to adhesion of a foreign object or the like. Therefore, the circuit breaking system according to the third embodiment of the present invention provides an improvement in redundancy, an improvement in contact reliability, and an increase in the lifetime of the contacts.

According to the circuit breaking systems according to the embodiments of the present invention, while the drive power supply is turned off, the normally closed contact shorts out the power output, by taking advantage of the feature that the normally open contact and the normally closed contact are not turned on at the same time owing to the conjunction between the contacts using the safety relay, thus allowing preventing the supply of power even if there is a short circuit. Furthermore, when there is a short of the power supply, a break in power and the short can be detected with respect to the on/off controlled power outputs using the relatively simple circuit (single safety relay).

What is claimed is:
1. A circuit breaking system comprising:
an output device for outputting an output signal;
a control device controlled by the output signal of the output device;

a power input terminal provided in the output device, for supplying power to the control device;

a power supply for supplying power to the output device, the power supply has a ground terminal;

a break circuit disposed between a power output terminal, different from the ground terminal, of the power supply and the power input terminal of the output device;

a switching circuit disposed between the break circuit and the power output terminal; and a short circuit disposed between a ground and a node which connects the power input terminal and the break circuit, wherein the break circuit and the short circuit are operated so as to not be closed at the same time, when the switching circuit is closed, the break circuit is closed while the short circuit is open to supply power to the output device, when the switching circuit is open, the break circuit is open while the short circuit is closed to cut off the supply of power to the output device, and even when the power output terminal and the power input terminal are wrongly shorted out, the short circuit prevents the supply of power to the output device.

2. The circuit breaking system according to claim 1, wherein each of the break circuit and the short circuit is a switch, the break circuit has a normally open contact, while the short circuit has a normally closed contact, the normally open contact and the normally closed contact are mechanically coupled, and the mechanical coupling operates the switches so as not to close the normally open contact and the normally closed contact at the same time.

3. The circuit breaking system according to claim 1, wherein the power output terminal is provided with a protection circuit for cutting off an output, when a current of a predetermined value or more has flowed, and when the power output terminal and the power input terminal are wrongly shorted out, the protection circuit detects an overcurrent owing to the short circuit of the power output terminal, and cuts off the output of the power output terminal.

4. The circuit breaking system according to claim 1, further comprising:

a CPU into which a plurality of input signals are inputted, wherein the voltage of the power output terminal of the control device and the states of the break circuit and the short circuit are monitored using the input signals inputted to the CPU, and when the CPU detects a defect in the voltage of the power output terminal or a defect in the states of the break circuit and the short circuit, a notification of the defect is provided.

5. The circuit breaking system according to claim 1, wherein the break circuit has at least one other break circuit connected to the break circuit in series, the short circuit has at least one other short circuit connected to the short circuit in parallel, and the at least one other break circuit opens and closes in the same manner as the break circuit, and the at least one other short circuit opens and closes in the same manner as the short circuit.

\* \* \* \* \*